(12) United States Patent
Park et al.

(10) Patent No.: US 9,170,471 B2
(45) Date of Patent: Oct. 27, 2015

(54) OPTICAL SYSTEM HAVING INTEGRATED ILLUMINATION AND IMAGING OPTICAL SYSTEMS, AND 3D IMAGE ACQUISITION APPARATUS INCLUDING THE OPTICAL SYSTEM

(75) Inventors: Yong-hwa Park, Yongin-si (KR); Jang-woo You, Yongin-si (KR); Alexander Shirankov, Moscow (RU); Stanislav Shtykov, Moscow (RU); Viktor Pavlov, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 584 days.

(21) Appl. No.: 13/156,789

(22) Filed: Jun. 9, 2011

(65) Prior Publication Data

US 2012/0147143 A1    Jun. 14, 2012

(30) Foreign Application Priority Data

Dec. 14, 2010 (KR) .......................... 10-2010-0127867

(51) Int. Cl.
*H04N 13/02* (2006.01)
*G03B 15/03* (2006.01)
*G02B 7/32* (2006.01)
(Continued)

(52) U.S. Cl.
CPC ........ *G03B 15/03* (2013.01); *G02B 7/32* (2013.01); *G03B 13/20* (2013.01); *G03B 35/08* (2013.01)

(58) Field of Classification Search
CPC ........ G03B 15/03; G03B 35/08; G03B 13/20; G02B 7/32
USPC ............................................ 348/46; 396/155
See application file for complete search history.

(56) References Cited

U.S. PATENT DOCUMENTS 6,057,909 A * 5/2000 Yahav et al. ................. 356/5.04
6,100,517 A   8/2000 Yahav et al.
(Continued)

FOREIGN PATENT DOCUMENTS

DE      19907546 A1   10/1999
DE   102004038940 A1    2/2006
WO      03/073123 A1    9/2003

OTHER PUBLICATIONS

Communication from the European Patent Office issued May 30, 2014 in a counterpart European Application No. 11176499.9.

*Primary Examiner* — Christopher S Kelley
*Assistant Examiner* — Matthew Kwan
(74) *Attorney, Agent, or Firm* — Sughrue Mion, PLLC

(57) ABSTRACT

An optical system including integrated illumination and imaging optical systems, and a 3-dimensional (3D) image acquisition apparatus including the optical system. In the optical system of the 3D image acquisition apparatus, the illumination optical system and the imaging optical system are integrated to have a coaxial optical path. Accordingly, there is no parallax between the illumination optical system and the imaging optical system, so that depth information about an object acquired using illumination light may reflect actual distances between the object and the 3D image acquisition apparatus. Consequently, the depth information about the object may be more precise. The zero parallax between the illumination optical system and the imaging optical system may improve utilization efficiency of the illumination light. As a result, a greater amount of light may be incident on the 3D image acquisition apparatus, which ensures to acquire further precise depth information about the object.

4 Claims, 8 Drawing Sheets

(51) Int. Cl.
*G03B 13/20* (2006.01)
*G03B 35/08* (2006.01)

(56) References Cited

U.S. PATENT DOCUMENTS

| | | |
|---|---|---|
| 6,323,942 B1 | 11/2001 | Bamji |
| 7,016,519 B1 | 3/2006 | Nakamura et al. |
| 7,060,957 B2 | 6/2006 | Lange et al. |
| 7,095,487 B2 | 8/2006 | Gonzalez-Banos et al. |
| 2002/0183626 A1 | 12/2002 | Nordstrom et al. |
| 2004/0037450 A1* | 2/2004 | Bradski .................. 382/103 |
| 2005/0052755 A1* | 3/2005 | Lawson et al. ............ 359/722 |
| 2005/0179888 A1* | 8/2005 | Kallio ..................... 356/5.1 |
| 2006/0082656 A1* | 4/2006 | Ochiai ................ 348/207.99 |
| 2009/0263018 A1* | 10/2009 | Murakami et al. ......... 382/167 |
| 2009/0290198 A1* | 11/2009 | Hamano et al. ............ 358/475 |

* cited by examiner

OPTICAL SYSTEM HAVING INTEGRATED ILLUMINATION AND IMAGING OPTICAL SYSTEMS, AND 3D IMAGE ACQUISITION APPARATUS INCLUDING THE OPTICAL SYSTEM

CROSS-REFERENCE TO RELATED APPLICATION

This application claims priority from Korean Patent Application No. 10-2010-0127867, filed on Dec. 14, 2010, in the Korean Intellectual Property Office, the disclosure of which is incorporated herein by reference.

BACKGROUND

1. Field

Apparatuses consistent with exemplary embodiments related to an optical system in which an illumination optical system and an imaging optical system are integrated to have a coaxial optical axis in order to obtain more precise depth information, and a three-dimensional (3D) image acquisition apparatus including the optical system.

2. Description of the Related Art

With recent advances in 3D display apparatuses and increasing demand therefor, the significance of 3D content in which depth can be perceived is becoming important. Accordingly, research into 3D image acquisition apparatuses such as 3D cameras that enable users to create 3D content on their own is increasing. 3D cameras need to have a function through which depth information along with common 2D color image information are acquired through one photographing operation.

Depth information indicating distances between the 3D camera and surfaces of an object may be acquired using stereo vision methods that use two cameras, or using triangulation methods that use structured light and a camera. However, according to these methods, the greater the camera-to-object distance, the more imprecise the obtained depth information becomes, and these methods are highly dependent on the surface states of objects. Thus, acquiring precise depth information with these methods is difficult.

To address these problems, Time-of-Flight (TOF) techniques have been introduced. TOF techniques measure a travel time of illumination light reflecting off an object after having been irradiated thereon to a light receiving unit for receiving the illumination light. TOF technology involves irradiating light having a specific wavelength (for example, near infrared rays having a wavelength of 850 nm) onto an object by using an illumination optical system that includes a light emitting diode (LED) or a laser diode (LD), receiving the light with a light receiving unit after the light is reflected off the object, and a series of process for extracting depth information, for example, by modulating the received light using a modulator with a known gain wavelength. Various TOF technologies for the series of processes are available.

In measuring distance using light reflected off an object after having been projected from an illumination optical system, the greater an amount of the reflected light that is incident on a 3D camera, the more precise obtained depth information becomes. This is because in signal processing for extracting depth information using a 3D camera, a signal-to-noise ratio is proportional to an amount of incident light, and the greater the signal-to-noise ratio, the more precise obtained depth information becomes. Therefore, an optical system needs to be designed to provide a 3D camera which receives as much incident light as possible.

A 3D camera adopting TOF technology includes, in general, an illumination optical system that emits illumination light for acquiring depth information, and an imaging optical system for acquiring an image of an object. However, since the illumination optical system and the imaging optical system are separate systems, they have optical axes that do not match. Accordingly, parallax occurs between the illumination optical system and the imaging optical system. This may cause obtained depth information about an object to be imprecise, lowering utilization efficiency of illumination light.

SUMMARY

Exemplary embodiments provide optical systems in which an illumination optical system and an imaging optical system are integrated to have a coaxial optical axis in order to obtain more precise depth information using a 3D image acquisition apparatus.

Exemplary embodiments also provide 3D image acquisition apparatuses including the optical systems.

According to an aspect of exemplary embodiments, an optical system of a 3-dimensional image acquisition apparatus includes: an imaging objective lens with an aperture in a center region thereof through which an optical axis passes; an illumination objective lens disposed within the aperture of the imaging objective lens; and a light source for providing illumination light to the illumination objective lens, wherein the imaging objective lens and the illumination objective lens are coaxially disposed to share an optical axis passing through centers thereof.

The light source may be located on a non-focal plane of the imaging objective lens on the optical axis.

The optical system may further include a plane mirror disposed on the optical axis to correspond to the aperture of the imaging objective lens, wherein the plane mirror may be located on a non-focal plane of the imaging objective lens, and the light source may be disposed off the optical axis to emit the illumination light toward the plane mirror.

The optical system may further include a matching lens between the light source and the plane mirror.

The optical system may further include a beam shaping element disposed between the plane mirror and the light source, for uniformly homogenizing the illumination light emitted from the light source, and changing a cross-sectional shape of the illumination light.

The optical system may further include a first matching lens disposed between the beam shaping element and the plane mirror, and a second matching lens disposed between the beam shaping element and the light source.

The beam shaping element may include an integrator rod made of a transparent material to have a rectangular cross-section.

The optical system may further include a curved mirror disposed on the optical axis to correspond to the aperture of the imaging objective lens, wherein the curved mirror may be located on a non-focal surface of the imaging objective lens, and the light source may be disposed off the optical axis to emit the illumination light toward the curved mirror.

The curved mirror may include a convex mirror having a convex reflecting surface.

The optical system may further include a light transmission member that transmits condensed light from the light source to the curved mirror.

The light transmission member may include an optical fiber.

According to an aspect of another exemplary embodiment, an optical system of a 3-dimensional image acquisition apparatus includes: an imaging objective lens with an aperture in a center region thereof through which an optical axis passes; a mirror disposed on the optical axis to correspond to the aperture of the imaging objective lens; a light source disposed off the optical axis to emit illumination light toward the mirror; and a flat transparent window disposed with the aperture of the imaging objective lens, wherein the mirror is located on a non-focal plane of the imaging objective lens on the optical axis.

The mirror may include a convex mirror having a convex reflecting surface.

The mirror may include a plane mirror having a flat reflecting surface.

The optical system may further include an illumination objective lens disposed between the plane mirror and the light source, and for projecting the illumination light emitted from the light source onto an object.

The optical system may further include a beam shaping element disposed between the illumination objective lens and the light source, for uniformly homogenizing the illumination light emitted from the light source, and changing a cross-sectional shape of the illumination light.

According to an aspect of an exemplary embodiment, an optical system of a 3-dimensional image acquisition apparatus includes: a common objective lens; a light source that provides illumination light to a center region of the common objective lens; and a matching lens that optically matches the light source to the center region of the common objective lens, wherein the light source is located on a non-focal plane of the imaging objective lens on an optical axis of the common objective lens.

According to an aspect an exemplary embodiment, an optical system of a 3-dimensional image acquisition apparatus includes: a common objective lens; a plane mirror disposed on an optical axis of the common objective lens; a light source disposed off the optical axis to emit light toward the plane mirror; for providing the light as illumination light to a center region of the common objective lens; and a first matching lens disposed between the plane mirror and the light source, for optically matching the light source to the center region of the common objective lens, wherein the plane mirror is located on a non-focal plane of the common objective lens on the optical axis.

The optical system may further include: a beam shaping element disposed between the first matching lens and the light source, for uniformly homogenizing the illumination light emitted from the light source, and changing a cross-sectional shape of the illumination light; and a second matching lens disposed between the beam shaping element and the light source.

According to an aspect of another exemplary embodiment, a 3-dimensional image acquisition apparatus includes: the optical system described above for projecting illumination light onto an object and focusing light reflected off the object; an image processing unit that processes the illumination light focused by the optical system to generate an image signal; and a control unit that controls operations of the optical system and the image processing unit, wherein the light source is located on an optical axis between the optical system and the image processing unit.

The image processing unit may include: an optical modulator that modulates incident light to have a predetermined gain waveform; an imaging device that generates an electric image signal by sensing the modulated light; and a collective lens disposed in front of the optical modulator to prevent the light source located on the optical axis from obstructing the generation of the electric image signal in the imaging device.

The image processing unit may further include an iris that blocks light scattering from the light source located on the optical axis.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
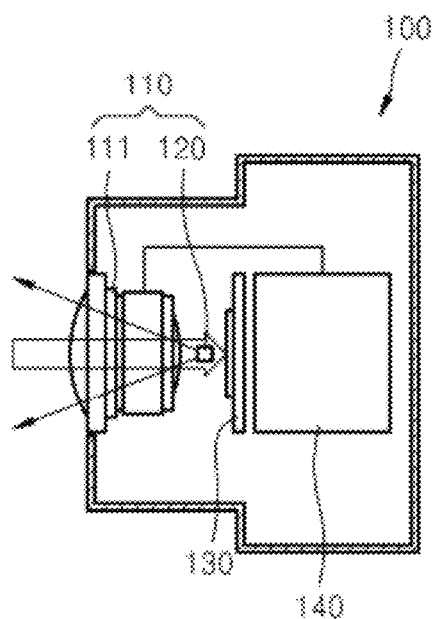
FIG. 1 is a conceptual view illustrating a structure of a 3D image acquisition apparatus, according to an exemplary embodiment.

Reference will now be made in detail to exemplary embodiments of an optical system having integrated illumination and imaging optical systems, and a 3D image acquisition apparatus including the optical system, examples of which are illustrated in the accompanying drawings. In the drawings, like reference numerals in the drawings denote like elements, and the size of each component may be exaggerated for clarity.

FIG. 1 is a conceptual view illustrating a structure of a 3D image acquisition apparatus 100, according to an exemplary embodiment. Referring to FIG. 1, the 3D image acquisition apparatus 100 includes an objective lens 111 for focusing light reflected off an external object (not shown), an image processing unit 130 for processing the light focused by the objective lens 111 to generate an image signal, an illumination optical system 120 for illuminating the object to acquire depth information about the object, and a control unit 140 for controlling the operations of the objective lens 111, the image processing unit 130, and the illumination optical system 120.

The illumination optical system 120 may irradiate illumination light, for example, infrared rays, onto the object. The infrared illumination light reflected off the object is focused on the image processing unit 130 by the objective lens 111. Simultaneously, external visible light reflected off the object may be focused on the image processing unit 130. The image processing unit 130 may generate a depth image signal for calculating the depth information about the object by modulating the illumination light using TOF technology. The image processing unit 130 may generate a standard color (RGB) image signal by using the visible light. The control unit 140 may calculate the depth information about the object using the generated depth image signal and the RGB image signal to generate an image for a user.

According to one embodiment, the illumination optical system 120 for illuminating the object may be integrated with the objective lens 111, which forms an imaging optical system for imaging the object, into one optical system 110. That is, as illustrated in FIG. 1, the illumination optical system 120 and the objective lens 111 may be disposed such that axes thereof are coaxial. When the optical axis of the illumination optical system 120 and the optical axis of the objective lens 111 coincide with each other, parallax will not occur between the optical illumination system 120 and the objective lens 111. Accordingly, the illumination light irradiated from the illumination optical system 120 may travel along the optical axis of the objective lens 111 to illuminate the object, reflect off the object, and then travel along the optical axis of the objective lens 111 to be focused on the image processing unit 130 by the objective lens 111. The matching paths of the irradiated illumination light and the reflected illumination light may allow depth information regarding a distance between the object and the 3D image acquisition apparatus 100 to be precisely calculated. Furthermore, a relatively great portion of the illumination light scattered and reflected off the object may be incident back on the objective lens 111, and thus utilization efficiency of the illumination light may be improved. This may increase the amount of the illumination light collected by the image processing unit 130, thus further improving the precision of the depth information about the object.

Figure 2:
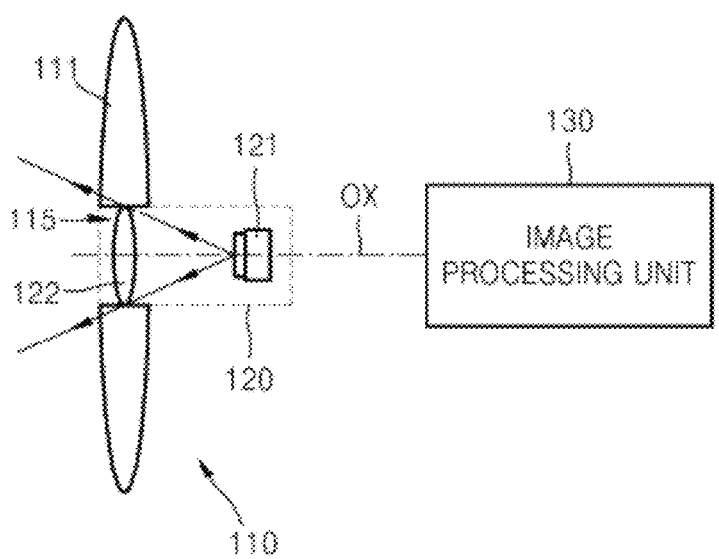
FIG. 2 is a schematic conceptual view illustrating a detailed structure of an integrated optical system in FIG. 1, according to an exemplary embodiment.

FIG. 2 illustrates a detailed structure of the optical system 110 in which the objective lens 111 as the imaging optical system and the illumination optical system 120 are coaxially integrated on an optical axis OX, according to an exemplary embodiment. Referring to FIG. 2, the optical system 110 may include an imaging objective lens 111 having an aperture 115 in a center region thereof where the optical axis OX passes, an illumination objective lens 122 disposed within the aperture 115 of the imaging objective lens 111, and a light source 121 that provides illumination light to the illumination objective lens 122. As illustrated in FIG. 2, the imaging objective lens 111 and the illumination objective lens 122 are coaxially disposed with the optical axis OX passing centers thereof. Accordingly, the optical axis of the imaging objective lens 111 and the optical axis of the objective lens 122 may coincide with each other.

Although each of the imaging objective lens 111 and the illumination objective lens 122 are illustrated as one lens in FIG. 2 for convenience of illustration, the imaging objective lens 111 and the illumination objective lens 122 may each be, for example, a variable-magnification zoom lens including a plurality of lenses. Zoom magnifications of the imaging objective lens 111 and the illumination objective lens 122 may be synchronously controlled. In one embodiment, the control unit 140 may simultaneously control the imaging objective lens 111 and the illumination objective lens 122 to have the same zoom magnification.

In some embodiments, the light source 121 may include an LED or an LD that emits light having an invisible infrared wavelength of about 850 nm, for the safety of a user. However, this is only exemplary, and light having any appropriate wavelength and various kinds of light sources may be used. The light source 121 may emit light having a specifically defined waveform, for example, a sign wave, a lamp wave, or a square wave, according to a control signal received from the control unit 140.

As illustrated in FIG. 2, the light source 121 may be located on the common optical axis of the imaging objective lens 111 and the illumination objective lens 122. The light source 121 may be located between the imaging objective lens 111 and the illumination objective lens 122, and the image processing unit 130. The light source 121 and the illumination objective lens 122 together may form the illumination optical system 120. Accordingly, after being incident on the illumination objective lens 122, infrared light emitted from the light source 121 may be projected onto the object via the illumination objective lens 122. To this end, the light source 121 may be located on a focal plane of the illumination objective lens 122.

Meanwhile, light reflected off the object and incident on the 3D image acquisition apparatus 100 is focused on the image processing unit 130 via the imaging objective lens 111. In this regard, to prevent the light source 121 located on the optical axis OX between the imaging objective lens 111 and the image processing unit 130 from blocking the light that is to enter the image processing unit 130, the light source 121 may be located on a non-focal plane of the imaging objective lens 111. When the light source 121 is located on a non-focal plane of the imaging objective lens 111, a light component that is incident on the light source 121 may be blurred, and thus the light source 121 may be almost or completely not seen by an imaging device 135 (see FIG. 3) of the image processing unit 130. Thus, even though the light source 121 is located between the imaging objective lens 111 and the image processing unit 130, the light source 121 may not influence imaging by the imaging device 135.

Figure 3:
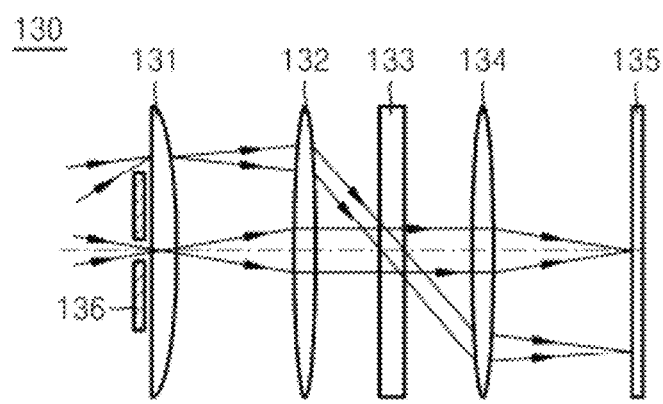
FIG. 3 is a schematic conceptual view illustrating a structure of an image processing unit of FIGS. 1 and 2, according to an exemplary embodiment.

To further diminish interference by the light source 121, the image processing unit 130 may include an additional optical structure. FIG. 3 exemplarily illustrates a structure of the image processing unit 130. Referring to FIG. 3, the image processing unit 130 may include a collective lens 131, a first relay lens 132, an optical modulator 133, a second relay lens 134, and the imaging device 135 sequentially in a direction in which light travels. To prevent light passing through the light source 121 from being detected by the imaging device 135, the collective lens 131 may allow only light passing through a region of the imaging objective lens 111 to enter the imaging device 135. Thus, the collective lens 131 may prevent the light source 121 from obstructing imaging. To this end, the light source 121 may be disposed on a non-focal plane of the collective lens 131. The collective lens 131 may be an aspheric lens that blocks a light portion passing through the light source 121, allowing only the rest of the light to be focused on the imaging device 135. To further block, for example, scattered light that may be generated by the light source 121, an iris 136 may be further disposed in front of the collective lens 131 with respect to the direction in which light travels. Although the iris 136 in FIG. 3 is a ring type with an aperture in a center thereof, a disk type iris without an aperture may be used. Although the iris 136 is disposed in front of the collective lens 131 in FIG. 3 with respect to the direction in which light travels, the location of the iris 136 is not specifically limited. In another embodiment, the iris 136 may be disposed between the collective lens 131 and the first relay lens 132.

The first relay lens 132 focuses light on the optical modulator 133. The second relay lens 134 focuses light modulated by the optical modulator 133 on the imaging device 135. The optical modulator 133 modulates incident light to have a predetermined gain waveform according to TOF technology to obtain the depth information about the object. The gain waveform obtained by the optical modulator 133 may be determined, for example, according to a control of the control unit 140. The imaging device 135 generates an electric image signal by sensing the light modulated by the optical modulator 133. In some embodiments the imaging device 135 may be a semiconductor imaging device, for example, an imaging charge-coupled device (CCD) or a complementary metal oxide semiconductor (CMOS) imaging device.

Figure 4:
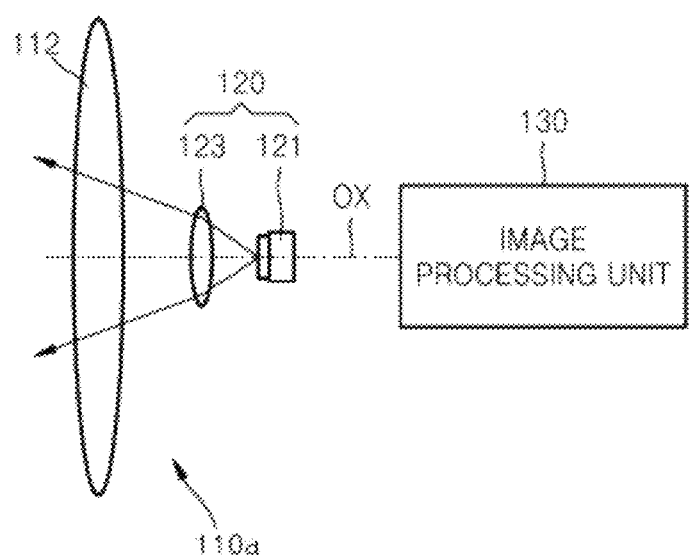
FIG. 4 is a schematic conceptual view illustrating a structure of an optical system, according to another exemplary embodiment.

Although the imaging objective lens 111 and the illumination objective lens 122 are illustrated as different lenses in the embodiment of FIG. 2, one common objective lens may function as both the imaging objective lens 111 and the illumination objective lens 122. FIG. 4 illustrates a structure of an optical system 110*a* using one common objective lens, according to another exemplary embodiment. Referring to FIG. 4, the optical system 110*a* may include one common objective lens 112, the light source 121 disposed on the optical axis OX between the common objective lens 112 and the image processing unit 130, and a matching lens 123 disposed between the light source 121 and the common objective lens 112. As described above, although illustrated as one lens in FIG. 4 for convenience of illustration, the common objective lens 112 may be a variable-magnification zoom lens including a plurality of lenses. In an embodiment where the common objective lens 112 is a zoom lens, a zoom magnification of the illumination optical system and the imaging optical system may remain constant without an additional precise control mechanism.

The elements of the optical system 110*a* not described above and operations thereof may be identical to those of the optical system 110 of FIG. 2. That is, the light source 121 may be located on a non-focal plane of the common objective lens 112. In this case, infrared light emitted from the light source 121 may not be projected precisely toward the object. The matching lens 123 optically matches the light source 121 to a central region of the common objective lens 112. By using the matching lens 123, the infrared light emitted from the light source 121 may be projected accurately onto the object via the central region of the common objective lens 112. Thus, a field of illumination of the optical system 110*a* may accurately coincide with a field of view of the 3D image acquisition apparatus 100.

Figure 5:
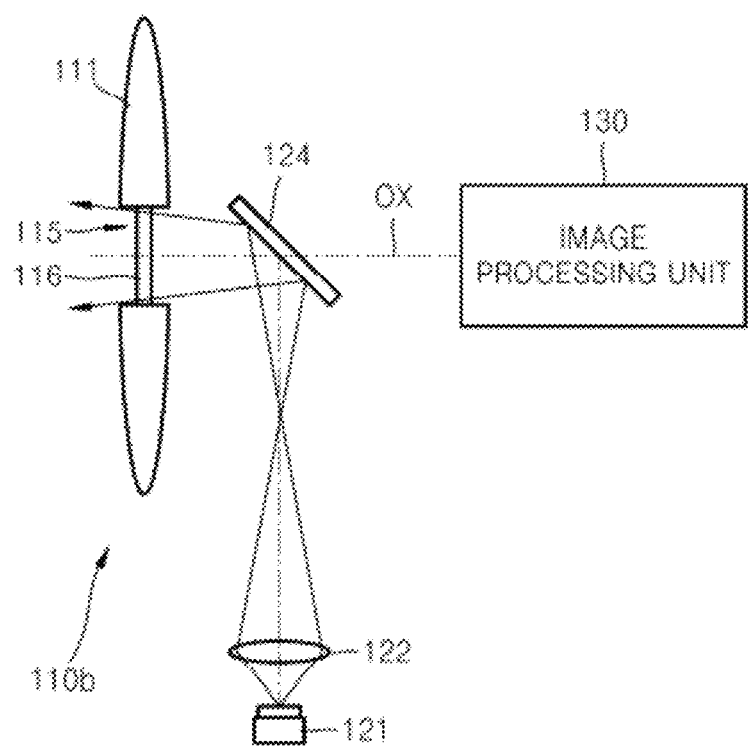
FIG. 5 is a schematic conceptual view illustrating a structure of an optical system, according to another exemplary embodiment.

To further diminish interference by the light source 121, the light source 121 may be located off the optical axis (OX), and a small mirror may be disposed on the optical axis OX. FIG. 5 is a schematic conceptual view illustrating a structure of an optical system 110*b*, according to another exemplary embodiment. Referring to FIG. 5, the optical system 110*b* may include the imaging objective lens 111 with the aperture 115 in the center thereof through which the optical axis OX passes, a plane mirror 124 located on the optical axis OX to correspond to the aperture 115, the light source 121 disposed off the optical axis OX to emit light toward the plane mirror 124, and the illumination objective lens 122 disposed between the light source 121 and the plane mirror 124. To prevent external harmful components such as dust and moisture from entering the 3D image acquisition apparatus 100 through the aperture 115, a flat transparent window 116 may be further disposed within the aperture 115 of the imaging objective lens 111.

The plane mirror 124 may be disposed where the light source 121 is located in the previous embodiment of FIG. 2. That is, the plane mirror 124 may be disposed on a non-focal plane of the imaging objective lens 111 between the imaging objective lens 111 and the image processing unit 130. As illustrated in FIG. 5, the plane mirror 124 may be disposed at an incline on the optical axis OX to reflect illumination light incident thereon from the light source 121 toward the aperture 115 of the imaging objective lens 111. Therefore, the plane mirror 124 may align the illumination light from the light source 121, which is disposed off the optical axis OX, with the optical axis OX.

In the embodiment of FIG. 2, the illumination objective lens 122 is disposed within the aperture 115 of the imaging objective lens 111, while in the embodiment of FIG. 5, the illumination objective lens 122 is disposed between the light source 121 and the plane mirror 124 off the optical axis OX. The locations of the light source 121 and the objective lens 122 off the optical axis OX may lead to an increased degree of freedom in sizing and designing the light source 121, the illumination objective lens 122, and the imaging objective lens 111. Furthermore, the location of the plane mirror 124, which is smaller in volume relative to the light source 121, on the optical axis OX may less likely obstruct imaging in the image processing unit 130. Accordingly, designing the collective lens 131 of the image processing unit 130 may be facilitated. In another embodiment, the collective lens 131 and the iris 136 may be omitted.

Figure 6:
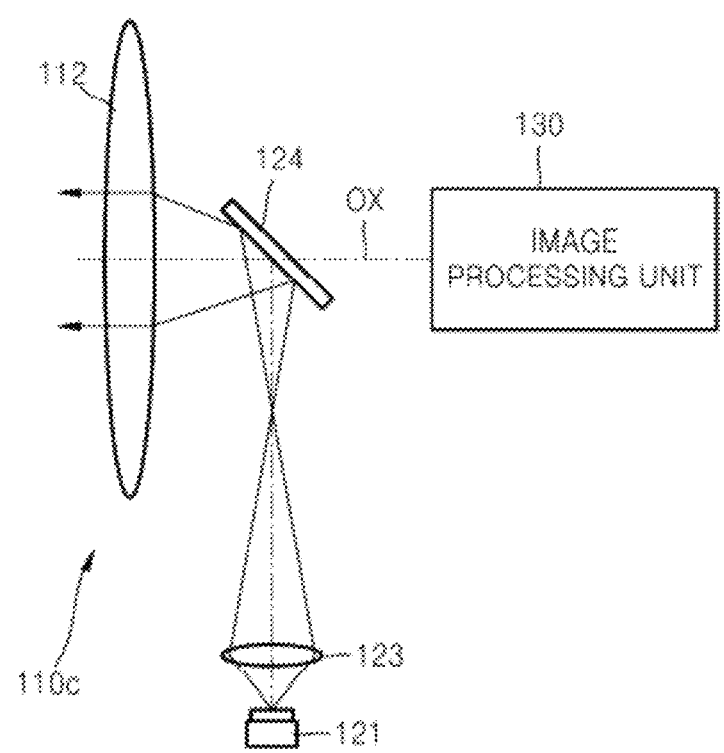
FIG. 6 is a schematic conceptual view illustrating a structure of an optical system, according to another exemplary embodiment.

In another embodiment, the common objective lens 122 of FIG. 4 may be used along with the plane mirror 124. FIG. 6 is a conceptual view illustrating a structure of an optical system 110*c*, according to another exemplary embodiment of the present invention. Referring to FIG. 6, the optical system 110*c* may include the common objective lens 112, the plane mirror 124 disposed on the optical axis OX between the common objective lens 112 and the image processing unit 130, the light source 121 disposed off the optical axis OX to emit light toward the plane mirror 124, and the matching lens 123 disposed between the light source 121 and the plane mirror 124. As described above, in an embodiment where the common objective lens 112 is a zoom lens, a zoom magnification of the illumination optical system and the imaging optical system may remain constant without an additional control mechanism.

As in the embodiment of FIG. 5, the plane mirror 124 may be located on a non-focal plane of the common objective lens 112. The matching lens 123 may adjust a beam diameter of illumination light emitted from the light source 121 to be wholly incident on the plane mirror 124. The matching lens 123 may optically match the light source 121 to the central region of the common objective lens 112 to enable the illumination light to be accurately projected onto the object via the central region of the common objective lens 112.

Figure 7:
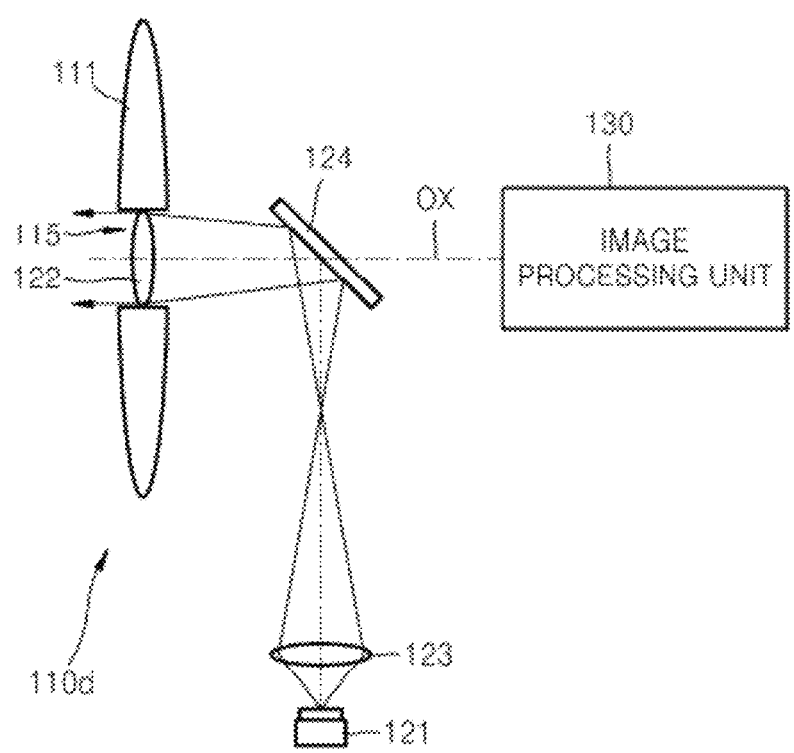
FIG. 7 is a schematic conceptual view illustrating a structure of an optical system, according to another exemplary embodiment.

In an embodiment where the plane mirror 124 is used, the illumination objective lens 122 may be disposed within the aperture 115 of the imaging objective lens 111 as in the embodiment of FIG. 2. FIG. 7 is a conceptual view illustrating a structure of an optical system 110*d*, according to another exemplary embodiment of the present invention. Referring to FIG. 7, the optical system 110*d* may include the imaging objective lens 111 with the aperture 115 in the center thereof through which the optical axis OX passes, the illumination objective lens 122 disposed within the aperture 115 of the imaging objective lens 111, the plane mirror 124 located on the optical axis OX to correspond to the aperture 115, the light source 121 disposed off the optical axis OX to emit light toward the plane mirror 124, and the matching lens 123 disposed between the light source 121 and the plane mirror 124. The descriptions of the imaging objective lens 111 and the illumination objective lens 122 with reference to FIG. 2 may apply to those of the embodiment of FIG. 7. The descriptions of the plane mirror 124 and the light source 121 with reference to FIG. 5 may apply to those of the embodiment of FIG. 7. The matching lens 123 may adjust a beam diameter of illumination light emitted from the light source 121 to be wholly incident on the plane mirror 124. The matching lens 123 may also serve as a relay lens for matching a focal point of the illumination objective lens 122 to the light source 121.

Figure 8:
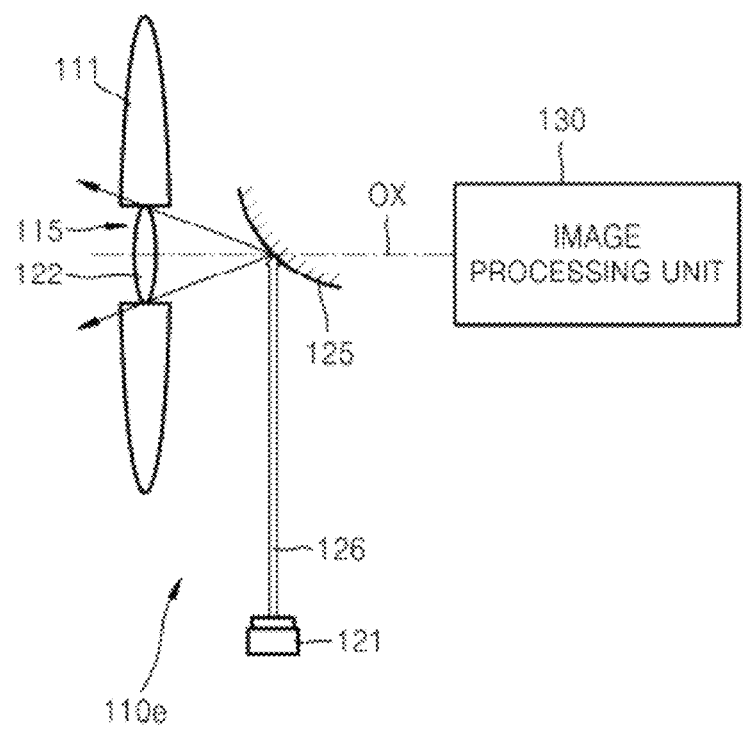
FIG. 8 is a schematic conceptual view illustrating a structure of an optical system, according to another exemplary embodiment.

Although the plane mirror 124 with a flat reflecting surface is used in the embodiments of FIGS. 5 and 7, a curved mirror with a reflecting surface having a curvature may also be used instead of the plane mirror 124. FIG. 8 is a conceptual view illustrating a structure of an optical system 110e, according to another exemplary embodiment. Referring to FIG. 8, the optical system 110e may include the imaging objective lens 111 with the aperture 115 in the center thereof through which the optical axis OX passes, the illumination objective lens 122 disposed within the aperture 115 of the imaging objective lens 111, a curved mirror 125 located on the optical axis OX to correspond to the aperture 115, and the light source 121 disposed off the optical axis OX to emit light toward the curved mirror 125. The descriptions of the imaging objective lens 111 and the illumination objective lens 122 with reference to FIG. 2 may apply to those of FIG. 8.

Similar to the plane mirror 124, the curved mirror 125 may be disposed on a non-focal plane of the imaging objective lens 111 on the optical axis OX between the imaging objective lens 111 and the image processing unit 130. As illustrated in FIG. 8, the curved mirror 125 may be a convex mirror having a convex reflecting surface. Accordingly, condensed illumination light having a relatively small beam diameter may be emitted from the light source 121 to the curved mirror 125. To this end, a light transmission member 126, for example, an optical fiber, may be used to transmit the illumination light from the light source 121 to the curved mirror 125. When the light transmission member 126, for example, an optical fiber, is used, an optical path from the light source 121 to the curved mirror 125 does not need to be straight, which may improve internal space utilization efficiency of the 3D image acquisition apparatus 100 including the optical system 110e. However, in another embodiment, the illumination light may be projected directly from the light source 121 toward the curved mirror 125 by using an appropriate collimating element.

When the convex curved mirror 125 is used, the illumination light emitted from the light source 121 may diverge at an angle by reflecting off the curved mirror 125. The illumination light reflected off the curved mirror 125 may be projected onto the object via the illumination objective lens 122. When the curvature of the reflecting surface of the curved mirror 125 is appropriately selected, the curved mirror 125 may serve as the matching lens 123 of FIG. 7. Thus, when the curved mirror 125 is used, the matching lens 123 of FIG. 7 for optical matching with the illumination objective lens 122 may be omitted. In another embodiment, the curved mirror 125 may be a concave mirror having a concave reflecting surface. For example, when illumination light diverging at an angle, instead of the condensed illumination light having a relatively small beam diameter, is used, the illumination light may be adjusted to be incident on only the illumination objective lens 122 by using the curved mirror having the concave reflecting surface.

Figure 9:
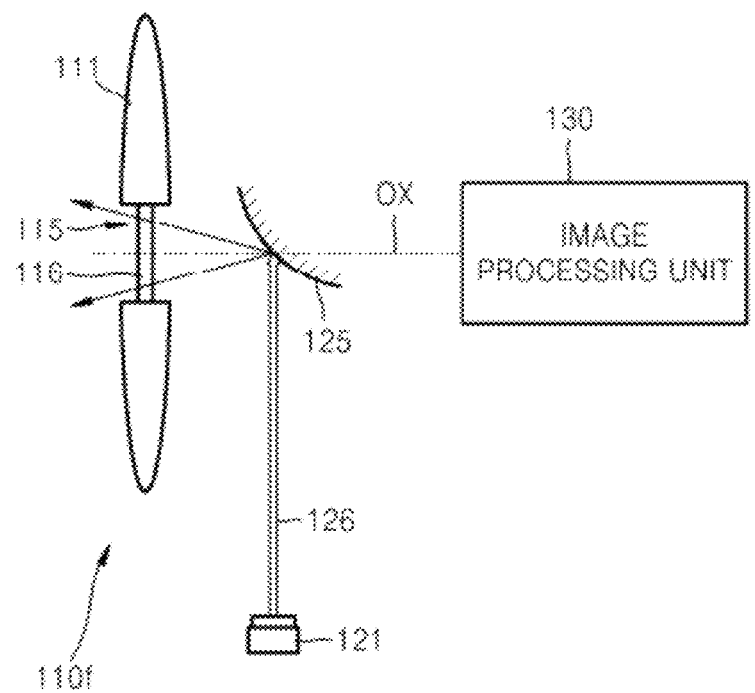
FIG. 9 is a schematic conceptual view illustrating a structure of an optical system, according to another exemplary embodiment.

Although serving only as a matching lens in the embodiment of FIG. 8, the curved mirror 125 may also work as the illumination objective lens 122 for projecting illumination light onto the object. FIG. 9 is a conceptual view illustrating a structure of an optical system 100f, according to another exemplary embodiment. Referring to FIG. 9, the optical system 100f may include the imaging objective lens 111 with the aperture 115 in the center thereof through which the optical axis OX passes, the curved mirror 125 located on the optical axis OX to correspond to the aperture 115, and the light source 121 disposed off the optical axis OX to emit light toward the curved mirror 125. To prevent external harmful components such as dust and moisture from entering the 3D image acquisition apparatus 100 through the aperture 115, the flat transparent window 116 having zero curvature may be further disposed within the aperture 115 of the imaging objective lens 111.

As described above, condensed illumination light having a relatively small beam diameter may be transmitted from the light source 121 to the curved mirror 125 by using the light transmission member 126, which may be an optical fiber. The curved mirror 125 having the convex reflecting surface may reflect the illumination light to diverge the illumination light at a constant angle. When the curvature of the curved mirror 125 is appropriately selected, the illumination light reflected off the curved mirror 125 may be projected directly onto the object through the transparent window 116. Accordingly, the illumination objective lens 122 may be unnecessary, and the imaging objective lens 111 may be a short focus lens having a fixed magnification corresponding to the curvature of the curved mirror 125.

To further increase utilization efficiency of illumination light in order to obtain more precise depth information about the object, a field of illumination of the illumination optical system 120 may be matched with a field of view of the 3D image acquisition apparatus 100. In general, the field of view of the 3D image acquisition apparatus 100 may be rectangular with an aspect ratio of about 4:3, while a cross-section (i.e., the field of illumination) of the illumination light is circular. When the field of illumination and the field of view do not coincide with each other, a portion of the illumination light may not be used to obtain the depth information. This may reduce the utilization efficiency of the illumination light. Therefore, when the cross-section of the illumination light is made to be rectangular with an aspect ratio of about 4:3, which is equal to that of the field of view of the 3D image acquisition apparatus 100, the utilization efficiency of the illumination light may be improved.

Figure 10:
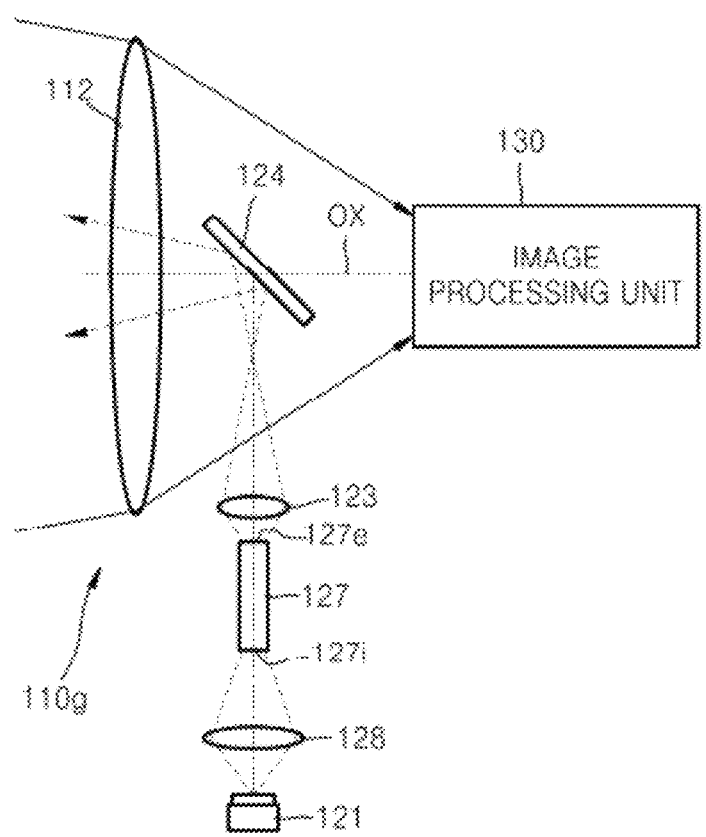
FIG. 10 is a schematic conceptual view illustrating a structure of an optical system, according to another exemplary embodiment.

FIG. 10 is a schematic view illustrating a structure of an optical system 110g, according to another exemplary embodiment. Referring to FIG. 10, the optical system 110g may include the common objective lens 112, the plane mirror 124 disposed on the optical axis OX between the common objective lens 112 and the image processing unit 130, the light source 121 disposed off the optical axis OX to emit illumination light toward the plane mirror 124, a beam shaping element 127 disposed between the light source 121 and the plane mirror 124, a first matching lens 123 disposed between the plane mirror 124 and the beam shaping element 127 to match the illumination light emitted from the beam shaping element 127 to the center region of the common objective lens 112, and a second matching lens 128 disposed between the light source 121 and the beam shaping element 127 to project the illumination light emitted from the light source 121 onto the beam shaping element 127.

The beam shaping element 127 uniformly homogenizes the illumination light emitted from the light source 121 and changes a cross-sectional shape of the illumination light to a predetermined shape. For example, the beam shaping element 127 may change the cross-sectional shape of the illumination light to be rectangular with an aspect ratio of about 4:3. To this end, the beam shaping element 127 may be an integrator rod made of a transparent material, for example, glass or a light-transmitting plastic, and having a rectangular cross-section. A light-incidence surface 127i and a light-exit surface 127e of the beam shaping element 127 may each have an anti-reflection coating to reduce light loss due to reflection. A circumferential surface of the beam shaping element 127 may have a high-reflectivity coating. Accordingly, the illumination light incident on the light-incidence surface 127i undergoes total internal reflection while traveling in the beam shaping element 127, and emerges from the beam shaping element 127 through the light-exit surface 127e. The illumination light emitted from the light-exit surface 127e may have a rectangular cross-section that is identical to that of the beam shaping element 127. Therefore, the field of illumination of the illumination optical system 120 may coincide with the field of view of the 3D image acquisition apparatus 100. While undergoing total continuous reflection in the beam shaping element 127, light beams traveling along various paths are mixed together, homogenizing light intensity across the whole cross-section of illumination. Consequently, the light intensity may be substantially the same at any spot within the field of illumination.

Although in the embodiment of FIG. 10 the beam shaping element 127 is used along with one common objective lens 112, in another embodiment the beam shaping element 127 may be used along with the imaging objective lens 111 (see FIG. 2) with the aperture 115 in the center region thereof through which the optical axis OX passes, and the illumination objective lens 122 (see FIG. 2) separated from the imaging objective lens 111. For example, as illustrated in FIG. 2, the illumination objective lens 122 may be disposed within the aperture 115 of the imaging objective lens 111. As another example, as illustrated in FIG. 5, the transparent window 116 may be disposed within the aperture 115 of the imaging objective lens 111, and the illumination objective lens 122 may be disposed where the first matching lens 123 is located in FIG. 1. The curved mirror 125 (see FIG. 9) may be used instead of the plane mirror 124.

So far to help understand exemplary embodiments of optical systems including integrated illumination and imaging optical systems, and 3D image acquisition apparatuses including the optical systems, the above description is provided with reference to the appended drawings. However, it should be understood that the exemplary embodiments described herein should be considered in a descriptive sense only and not for purposes of limitation.

What is claimed is:

1. An optical system of a 3-dimensional image acquisition apparatus, the optical system comprising:
    an imaging lens with an aperture in a center region thereof through which an optical axis passes;
    an illumination lens disposed within the aperture of the imaging lens, wherein the imaging lens and the illumination lens are coaxially disposed on the optical axis;
    a light source for providing illumination light to the illumination lens; and
    a curved mirror disposed on the optical axis, wherein the curved mirror is located on a non-focal surface of the imaging lens, and the light source is disposed off the optical axis to emit the illumination light toward the curved mirror.

2. The optical system of claim 1, wherein the curved mirror comprises a convex mirror having a convex reflecting surface.

3. The optical system of claim 2, further comprising a light transmission member that transmits condensed light from the light source to the curved mirror.

4. The optical system of claim 3, wherein the light transmission member comprises an optical fiber.

* * * * *